United States Patent Office 3,268,574
Patented August 23, 1966

3,268,574
BIS(AMINOHYDROCARBYL)CARBONATES
Thomas K. Brotherton and John W. Lynn, Charleston, W. Va., assignors to Union Carbide Corporation, a corporation of New York
No Drawing. Original application Dec. 28, 1960, Ser. No. 78,865, now Patent No. 3,162,673, dated Dec. 22, 1964. Divided and this application Dec. 6, 1963, Ser. No. 328,512
4 Claims. (Cl. 260—463)

This invention relates, in general, to novel diamines and to a process for their preparation. In one aspect, this invention relates to a new class of carbonate diamines and novel salts thereof.

This application is a divisional application of Serial No. 78,865, entitled "Novel Diamines and Process for Preparation," filed December 28, 1960, and now Patent No. 3,162,673, by T. K. Brotherton and J. W. Lynn and assigned to the same assignee as the instant invention.

It has been reported in the literature that tertiary aminoalkyl alcohols, particularly the 2-dialkylaminoethyl alcohols, react with phosgene to yield the corresponding tertiary aminoalkyl carbonates. Moreover, under milder conditions the hydrohalides of 2-dialkylaminoethyl alcohols have been known to react with phosgene to yield the corresponding 2-dialkylaminoethyl chloroformate hydrohalides. In contrast, however, the primary and secondary aminoalkyl alcohols are not known to react with phosgene to form the corresponding bis-(aminoalkyl) carbonates, but rather yield only cyclic products such as the oxazolidinones. Furthermore, attempts to prepare bis(2-aminoethyl) carbonate by an ester exchange using diethyl carbonate and monoethanolamine have proven entirely unsuccessful.

It has now been found that a novel class of carbonate diamines can be produced from hydroxy compounds having a primary amino group to the virtual exclusion of any cyclic by-products. These novel carbonate diamines can be conveniently represented by the following general formula:

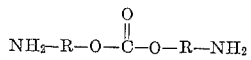

wherein R represents a member selected from the group consisting of divalent substituted and unsubstituted aliphatic, aromatic, alicyclic and heterocyclic groups. Preferred compounds are those wherein R represents a divalent radical containing from 2 to 12 carbon atoms. Particularly preferred compounds represented by the aforesaid formula are those wherein R represents a member selected from the group consisting of alkylene, alkenylene, alkynylene, arylene, arylenealkylene, alkylenearylene, arylenealkynylene, alkynylenearylene, cycloalkylene, cycloalkenylene, alkylcycloalkylene, alkylcycloalkenylene, cycloalkylenealkylene, cycloalkenylenealkylene, heterocyclylene, heterocyclylenealkylene, alkenylenheterocyclylene, aryleneheterocyclylene, and heterocyclylenearylene groups containing from 2 to 12 carbon atoms, Additionally, the present invention encompasses the carbonate diamine acid addition salts of the aforementioned novel compounds having the formula:

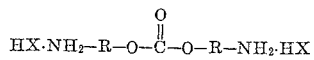

wherein R has the same value as previously defined and HX represents hydrogen chloride, hydrogen bromide, or mineral acids such as sulfuric, phosphoric and the like.

Illustrative compounds encompassed by the present invention include, among others, bis(2-aminoethyl) carbonate, bis(9-aminononyl) carbonate, bis(4-aminophenyl) carbonate, bis(3-aminocyclohexyl) carbonate, bis(4-amino-2-butenyl) carbonate, and the corresponding salts thereof.

The term "substituted" as used throughout the specification and appended claims is meant to further define the novel compositions of matter to include those wherein the aforementioned R groups can be aliphatic with alicyclic or aromatic substituents; alicyclic with aliphatic or aromatic substituents; or aromatic with aliphatic or alicyclic substituents, in addition to other groups hereinafter indicated.

The novel compounds of this invention are multifunctional in that each compound contains at least two primary amino groups in the molecule. Due to the presence of the amino groups, the novel compounds of this invention are useful as curing agents for epoxy resins, and as intermediates for the preparation of numerous chemical compounds. In particular, the compositions of this invention are useful in the preparation of novel carbonate diisocyanates and related compounds.

It is accordingly an object of the present invention to provide novel diamines and salts thereof which are suitable for use in the plastic and resin field. Another object is to provide novel compositions of matter comprising the carbonate diamines and novel salts thereof. A further object of the present invention is to provide new compositions of matter comprising the bis(aminoalkyl) carbonates, the bis(aminocycloalkyl)carbonates, the bis(aminoaryl) carbonates, and their corresponding salts. Another object of this invention is to provide novel carbonates containing at least two primary amino groups. A still further object of the present invention is to provide novel compounds having polyfunctional properties in that they contain at least two reactive amino groups. Another object of the present invention is to provide a novel process for the preparation of the aforesaid compositions. These and other objects will readily become apparent to those skilled in the art in the light of the teachings herein set forth.

In its broad aspect, this invention is directed to novel carbonate diamines of the aforementioned general formula, novel salts thereof, and a process for their preparation. These novel compositions are multifunctional in nature in that each compound is characterized by the presence of at least two primary amino groups which are available for reaction.

In one embodiment of the present invention the novel carbonate diamines can be represented by the aforesaid general formula wherein each R group is a divalent substituted or unsubstituted, aliphatic group and need not be the same throughout the molecule. Preferred compounds within this embodiment are those represented by the class formula:

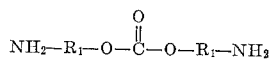

wherein $R_1$ represents a divalent substituted or unsubstituted, aliphatic group containing from 2 to 12 carbon atoms. Particularly preferred compounds within this embodiment are those wherein $R_1$ is a member selected from the group consisting of alkylene, alkenylene, alkynylene, cycloalkylalkylene, cycloalkenylalkylene, and arylalkylene groups containing from 2 to 10 carbon atoms. The divalent radical can be either straight or branched chain and need not be the same throughout the molecule.

The following compounds illustrate the novel carbonate diamines of this embodiment of the present invention. Bis(2-aminoethyl) carbonate, bis(3-aminopropyl) carbonate, bis(4-aminobutyl) carbonate, bis(5-aminopentyl) carbonate, bis(7-aminoheptyl) carbonate, bis(8-aminooctyl) carbonate, bis(9-aminononyl) carbonate, bis(10-aminodecyl) carbonate, bis(2-methyl-3-aminopropyl) carbonate, bis(2,2-dimethyl-3-aminopropyl) carbonate, bis(3-ethyl-5-aminopentyl) carbonate, bis(3,4-diethyl-5-aminopentyl) carbonate, bis(4,4-dimethyl-6-aminohexyl) carbonate, bis(2-methyl-4-ethyl-6-aminohexyl) carbonate, bis(9-aminononyl) carbonate, bis(5,6,7-triethyl-9-aminononyl) carbonate, 2-aminoethyl 3-aminopropyl carbonate, 4-aminobutyl 6-aminohexyl carbonate, 3-aminopropyl 8-aminooctyl carbonate, 5-aminopentyl 6-aminohexyl carbonate, 2-methyl-3-aminopropyl 2-aminoethyl carbonate, 4-ethyl-7-aminoheptyl 6-aminohexyl carbonate, bis(4-amino-2-butenyl) carbonate, bis(5-amino-3-pentenyl) carbonate, bis(7-amino-4-heptenyl) carbonate, bis(8-amino-4-octenyl) carbonate, bis(9-amino-5-nonenyl) carbonate, bis(10-amino-6-decenyl) carbonate, bis(3-ethyl-5-amino-3-pentenyl) carbonate, bis(3,4-dimethyl-5-amino-3-pentenyl) carbonate, bis(2-methyl-4-ethyl-6-amino-3-hexenyl) carbonate, bis(5,6,7-triethyl-9-amino-5-nonenyl) carbonate, 4-amino-2-butenyl 3-aminopropyl carbonate, 4-amino-2-butenyl 5-amino-3-pentenyl carbonate, 4-ethyl-7-amino-5-heptenyl 6-amino-3-hexenyl carbonate, bis(2-phenyl-3-aminopropyl) carbonate, bis(3-naphthyl-5-aminopentyl) carbonate, bis(3-styryl-5-aminopentyl) carbonate, bis(4-tolyl-6-aminohexyl) carbonate, bis(6-cumenyl-7-aminoheptyl) carbonate, bis(5-xylyl-8-aminooctyl) carbonate, bis(7-mesityl-9-aminononyl) carbonate, bis(2-cyclohexyl-3-aminopropyl) carbonate, bis(3-cyclohexyl-5-aminopentyl) carbonate, bis(4-cyclohexyl-6-aminohexyl) carbonate, bis(5-cyclohexylmethyl-7-aminoheptyl)carbonate, bis(3 - cycloheptyl-5-aminopentyl carbonate, bis(3-cyclohexenyl-5-aminopentyl) carbonate, bis(5-cycloheptenylmethyl-8-aminooctyl) carbonate and the like.

In a second embodiment of the present invention, the novel carbonate diamines can be represented by the aforementioned general formula wherein each R represents a divalent cycloaliphatic group and which need not be the same throughout the molecule. Preferred compounds within this embodiment are those represented by the class formula:

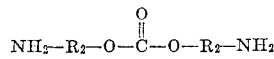

wherein $R_2$ represents a divalent substituted or unsubstituted cycloaliphatic radical containing from 4 to 12 carbon atoms. Particularly preferred compounds within this embodiment are those wherein $R_2$ is a member selected from the group consisting of cycloalkylene, cycloalkenylene, alkylcycloalkylene, alkylcycloalkenylene, alkylenecycloalkylene, and cycloalkylenealkylene groups containing from 4 to 10 carbon atoms. The divalent cycloaliphatic radical need not be the same throughout the molecule.

Illustrative novel carbonates diamines of this embodiment of the present invention include, among others, the following: bis(2-aminocyclobutyl) carbonate, bis(3-aminocyclopentyl) carbonate, bis(4-aminocyclohexyl) carbonate, bis(5-aminocycloheptyl) carbonate, bis(6-aminocyclooctyl) carbonate, bis(3-amino-4-cyclopentenyl) carbonate, bis(4-amino-5-cyclohexenyl) carbonate, bis(2-aminocyclobutylmethyl) carbonate, bis(2-amino-3-ethylcyclobutyl) carbonate, bis[2(2-aminoethyl)cyclobutyl] carbonate, bis(3-aminocyclopentylmethyl) carbonate, bis(3-amino-2-ethylcyclopentyl) carbonate, bis[3(2-aminoethyl)cyclopentyl] carbonate, bis(5-aminocycloheptylmethyl) carbonate, bis(3-amino-5-methylcyclohexyl) carbonate, bis(3-amino-5,6-dimethylcyclohexyl) carbonate, bis(3-amino-4-ethylcyclopentyl) carbonate, bis(3-amino-4,5-diethylcyclopentyl) carbonate, bis(4-amino-5-methyl-2-cyclohexenyl) carbonate and the like.

In another embodiment of the present invention, the novel carbonate diamines can be represented by the aforementioned general formula wherein each R represents a divalent aromatic group and which need not be the same throughout the molecule. Preferred compounds within this embodiment are those represented by the class formula:

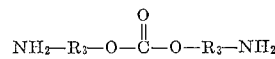

wherein $R_3$ represents a divalent substituted or unsubstituted aromatic radical containing from 6 to 12 carbon atoms. Particularly preferred compounds within this embodiment are those wherein $R_3$ is a member selected from the group consisting of arylene, arylenealkylene, alkylenearylene, alkylarylene, arylenealkenylene and alkenylenearylene groups containing from 6 to 10 carbon atoms. The divalent aromatic radicals need not be the same throughout the molecule.

Typical novel carbonate diamines encompassed by this embodiment of the present invention include, among others, the following: bis(4-aminophenyl) carbonate, bis(2-aminophenyl) carbonate, bis(3-aminophenyl) carbonate, bis(7-amino-2-naphthyl) carbonate, bis(7-amino-1-naphthyl) carbonate, bis(4'-amino-4-biphenylyl) carbonate, bis(5-amino-2-indenyl) carbonate, bis(4-aminobenzyl) carbonate, bis(4-aminophenylethyl) carbonate, bis(7-amino - 2 - naphthylmethyl) carbonate, bis[4(3'-aminopropyl)phenyl] carbonate, bis(4-aminomethylphenyl) carbonate, bis[2(3'-aminopropyl)naphthyl] carbonate, bis(4-amino-2-methylphenyl) carbonate, bis(6-amino-2,4-xylyl) carbonate, bis(4-amino-3-cumenyl) carbonate, bis(4-amino-2-methoxyphenyl) carbonate, bis(4-amino-2-styryl) carbonate, bis[4(3'-amino-1'-propenyl) phenyl] carbonate, and the like.

In a still further embodiment of the present invention the novel carbonate diamines can be represented for the aforementioned general formula wherein each R represents a divalent heterocyclic group and which need not be the same throughout the molecule. Preferred compounds within this embodiment are those represented by the class formula:

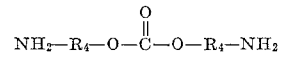

wherein $R_4$ represents a divalent substituted or unsubstituted heterocyclic radical containing from 4 to 12 carbon atoms. Particularly preferred compounds within this embodiment are those wherein $R_4$ is a member selected from the group consisting of heterocyclylene, heterocyclylenealkylene, alkyleneheterocyclylene, aryleneheterocyclylene, heterocyclylenearylene, alkylheterocyclylene, and arylheterocyclylene groups containing from 4 to 10 carbon atoms. The divalent heterocyclic radicals need not be the same throughout the molecule.

Novel carbonate diamines within this embodiment of the present invention include the following: bis(4-amino-3-furyl) carbonate, bis(6-amino-2-benzofuryl) carbonate, bis(7-amino-2-benzopyranyl) carbonate, bis(5-amino-2H-pyran-3-yl) carbonate, bis(5-amino-2-benzimidazolyl) carbonate, bis(5-amino-2-benzoxazolyl) carbonate, bis(4-aminoimidazolin-2-yl) carbonate, bis(6-amino-3-isoquinolyl) carbonate, and the like.

In accordance with the process of this invention, the novel carbonate diamines and salts of the aforementioned embodiments can be produced in relatively high yields by the reaction of a hydroxy amine salt, contained in an inert, normally liquid reaction medium with a carbonyl dihalide at a temperature which does not exceed the temperature at which the salt dissociates, and thereafter recovering the carbonate diamine dihydrohalide product.

In general, there are several factors which are critical to the successful preparation of the instant compounds. Firstly, it is necessary that the amino group of the hydroxy amine be eliminated as a reaction site in order to obtain exclusive reaction of the hydroxyl groups with phosgene and the intermediate chloroformate. Secondly, it is necessary that the amino groups of the carbonate diamines formed also be neutralized to minimize the possibility of rearrangement which is known to occur with free aminoalkyl esters but not with the corresponding salts of the aminoalkyl esters. Lastly, the particular products obtained from the reaction of salts of the hydroxy amine and phosgene are critically dependent upon the reaction temperature employed.

In practice, it has been found that the amino groups of the hydroxy amine starting compounds, as well as the resulting carbonate diamine, can be successfully shielded as a reaction site by the formation of the hydroxy amine salt prior to the phosgenation reaction. The salt, preferably the hydrochloride, can be formed and subsequently isolated prior to use, or employed directly without isolation. In the latter instance, solvents should be used which will remain inert during the phosgenation step. When the hydroxy amine salt is not to be isolated, it is usually necessary to conduct the neutralization in the solvent with gaseous hydrogen chloride at elevated temperatures in order to obtain a salt of satisfactory purity. When the hydroxy amine salt is to be isolated, it is preferred to effect neutralization in a solvent in which the amine is soluble, such as, for example, chloroform, dimethyl ether of ethylene glycol, tetrahydrofuran, dioxane and the like. In such circumstances, neutralization can be satisfactorily conducted at room temperature.

The products obtained from the phosgenation reaction were found to be critically dependent on the reaction temperature employed. At temperatures above 95° C., either at atmospheric or superatmospheric pressures, 2-chloroethylamine hydrochloride and 1- or 2-chloroethyl-isocyanate were the sole products isolated when monoethanolamine hydrochloride was treated with phosgene. These chlorinated products presumably were formed by an intramolecular reaction of the intermediate 2-aminoethyl chloroformate hydrochloride or by the direct action of by-product hydrogen chloride on the starting material.

Within the temperature range of from about 65° C. to about 95° C., the carbonate diamine dihydrochloride was the major product formed in yields as high as 95 percent. At a reaction temperature below 65° C., substantially all the starting material was recovered. The preferred operating temperature range was from about 70°–75° C. wherein optimum yield of the carbonate diamine dihydrohalide was recovered.

In general, the temperature necessary to produce the carbonate diamine dihydrohalides will be dependent upon both the melting point and the basicity of the particular hydroxy amine starting material. In actual practice, it has been found that the optimum yield will be obtained at a temperature which does not exceed the temperature at which the particular hydroxy amine hydrohalide would dissociate to the free amine under the conditions employed. Thus, while the phosgenation reaction is critically dependent upon the reaction temperature, the actual temperature employed will not necessarily be the same for each starting material. As a general rule, however, the temperature will usually fall within the range of from about 35° to about 150° C.

Pressure is not necessarily critical and the instant process can be conducted at atmospheric, subatmospheric or superatmospheric pressures, although the reaction of monoethanolamine hydrochloride and phosgene under pressures of up to 150 pounds per square inch and at temperatures of from about 60° to about 95° C., as a rule, gave lower yields of the carbonate diamine dihydrochloride than the corresponding reactions at atmospheric pressure.

In general, the liquid reaction medium employed in the conversion of the amine salt to the corresponding novel carbonate diamine dihydrohalide must be inert to the reactants and stable under the conditions employed. Moreover, it should be easily separable from the resulting carbonate diamine dihydrohalide. Typical inert, liquid solvents which have been found suitable for utilization as media in the process of the present invention include, among others, aromatic hydrocarbons such as toluene, xylene, naphthalene, tetrahydronaphthalene, benzene, biphenyl, cymene, amylbenzene; cycloaliphatic hydrocarbons such as cyclohexane, heptylcyclopentane, decahydronaphthalene; the chlorinated aromatic hydrocarbons such as chlorobenzene, ortho-dichlorobenzene, 1,2,4-trichlorobenzene; the chlorinated aliphatic hydrocarbons such as carbon tetrachloride, tetrachloroethylene, trichloroethylene; the dialkyl ketones such as diisobutyl ketone, methylisobuytl ketone, methylhexyl ketone, diisopropyl ketone and other solvents such as tetramethylene sulfone, and the like. Reaction media in which either the hydroxy amine salt or the carbonate diamine dihydrohalide, was soluble were found to be unsatisfactory. For example, solvents such as dioxane, dimethylether of ethylene glycol, and the like, were found unsuitable under the conditions employed. When these solvents were used in an attempted preparation of bis(2-aminoethyl) carbonate hydrochloride, only 2-chloroethyl isocyanate and considerable residue were isolated. None of the carbonate diamine dihydrohalide was detected.

Although the process of the instant invention preferably is conducted with phosgene, in its broadest concept the process includes the utilization of any carbonyl dihalide such as carbonyl difluoride, or carbonyl dibromide. However, for economic considerations phosgene is the preferred carbonyl dihalide. In the preparation of the novel isocyanates of this invention, phosgene can be used in either the gaseous or liquid form.

Inasmuch as the yield and rate of formation of the isocyanates are dependent upon several variables, for example, concentration of the hydroxy amine salt, solubility of the amine salt and phosgene in the reaction medium, reaction temperature, pressure and rate of addition of the phosgene, no hard and fast rule can be devised regarding the optimum conditions to be employed.

In a preferred embodiment of the present process a toluene solution containing the hydroxy amine salt in a concentration of from about 10 to 40 percent was gradually added to a solution of phosgene in toluene over a period of approximately 30 minutes. Thereafter phosgene was subsequently sparged through the reaction mixture for about 5 hours while the temperature is raised from about 65° to about 90° C. After removal of the by-product hydrogen halide and the solvent, a crude carbonate diamine dihydrohalide product was obtained which can be recovered by filtration and refined by known purification techniques such as washing and the like. The free carbonate diamine is obtained by basification of the corresponding dihydrohalide.

In practice, it has been found that the mole ratio of phosgene to hydroxy amine salt in the initial reaction medium preferably should be in excess of 3:1, although satisfactory results have been obtained at a lower ratio. When the phosgene subsequently is sparged into the reaction medium, feed rates of up to about 10 moles of phosgene per mole of amine salt per hour are preferred.

Although the direct phosgenation of the hydroxy amine salt in the inert normally liquid reaction medium in the absence of a hydrogen chloride acceptor is the most economically attractive process, the use of tertiary amines having basic strengths somewhat less than the amine as acceptors for the by-product halide often result in time and temperature advantages over the direct process.

The starting materials for the production of the novel carbonate diamines of the present invention, as hereinbefore indicated, are the corresponding salts of hydroxy compounds having primary amino groups. These compounds can be conveniently represented by the following general formula:

$$HX \cdot NH_2-R-OH$$

wherein R has the same value as previously indicated and HX represents hydrogen chloride, hydrogen bromide, or mineral acids such as sulfuric, phosphoric, and the like. Other acid salts can also be utilized but inasmuch as hydrogen chloride has a common anion with phosgene it is the preferred acid, both from this as well as economic considerations.

Suitable starting materials for the novel compositions of the first embodiment of this invention include the salts represented by the class formula:

$$HX \cdot HN_2-R_1-OH$$

wherein $R_1$ and HX are as previously defined. Illustrative starting compounds include the hydrohalide salts of the following primary amino alcohols: 2-aminoethyl alcohol, 3-aminopropyl alcohol, 4-aminobutyl alcohol, 5-aminopentyl alcohol, 7-aminoheptyl alcohol, 8-aminooctyl alcohol, 9-aminononyl alcohol, 10-aminodecyl alcohol, 2-methyl-3-aminopropyl alcohol, 2,2-dimethyl-3-aminopropyl alcohol, 3-ethyl-5-aminopentyl alcohol, 3,4-diethyl-5-aminopentyl alcohol, 4,4-dimethyl-6-aminohexyl, alcohol, 2-methyl-4-ethyl-6-aminohexyl alcohol, 9-aminononyl alcohol, 5,6,7-triethyl-9-aminononyl alcohol, 4-amino-2-butenyl alcohol, 5-amino-3-pentenyl alcohol, 7-amino-4-heptenyl alcohol, 8-amino-4-octenyl alcohol, 9-amino-5-nonenyl alcohol, 10-amino-6-decenyl alcohol, 3-ethyl-5-amino-3-pentenyl alcohol, 3,4-dimethyl-5-amino-3-pentenyl alcohol, 2-methyl-4-ethyl-6-amino-3-hexenyl alcohol, 5,6,7-triethyl-9-amino-7-nonenyl alcohol, 2-phenyl-3-aminopropyl alcohol, 3-naphthyl-5-aminopentyl alcohol, 3-styryl-5-aminopentyl alcohol, 4-tolyl-6-aminohexyl alcohol, 6-cumenyl-7-aminoheptyl alcohol, 5-xylyl-8-aminooctyl alcohol, 7-mesityl-9-aminononyl alcohol, 2-cyclohexyl-3-aminopropyl alcohol, 3-cyclohexyl-5-aminopentyl alcohol, 4-cyclohexyl-6-aminohexyl alcohol, 5-cyclohexylmethyl-7-aminoheptyl alcohol, 3-cycloheptyl-5-aminopentyl alcohol, 3-cyclohexenyl-5-aminopentyl alcohol, 5-cycloheptenyl-methyl-8-aminooctyl alcohol and the like.

The hydroxy amine salts which can be used for the preparation of the novel compositions of the second embodiment of this invention can be represented by the following formula:

$$HX \cdot NH_2-R_2-OH$$

wherein $R_2$ and HX are as previously defined. Illustrative starting materials include the hydrohalide salts of the following: 2-aminocyclobutyl alcohol, 3-aminocyclopentyl alcohol, 4-aminocyclohexyl alcohol, 5-aminocycloheptyl alcohol 6-aminocyclooctyl alcohol, 3-amino 4-cyclopentenyl alcohol, 4-amino-5-cyclohexenyl alcohol, 2-aminocyclobutyl-methyl alcohol, 2-amino-3-ethylcyclobutyl alcohol, 3-aminoethyl-2-cyclobutyl alcohol, 3-aminocyclopentylmethyl alcohol, 3-amino-2-ethylcyclopentyl alcohol, 3-aminoethyl-3-cyclopentyl alcohol, 5-aminocycloheptylmethyl alcohol, 3-amino-5-methylcyclohexyl alcohol, 3-amino-5,6-dimethylcyclohexyl alcohol 3-amino-4-ethylcyclopentyl alcohol, 3-amino-4,5-diethylcyclopentyl alcohol, 4-amino-5-methyl-2-cyclohexenyl alcohol, and the like.

Starting materials for the third embodiment of the instant invention can be represented by the following class formula:

$$HX \cdot NH_2-R_3-OH$$

wherein $R_3$ and HX are as previously defined typical starting compounds within this class formula include in salts of the following: 4-aminophenol, 2-aminophenol, 3-aminophenol, 7-amino-2-napthol, 7-amino-1-naphthol, 4'-amino-4-biphenylol 5-amino-2-indenol, 4-aminobenzyl alcohol, 4-aminophenylethyl alcohol, 7-amino-2-napthylmethyl alcohol, 3-aminopropyl-4-phenol, 4-aminomethylphenol 2(3'-aminopropyl)naphthol, 4-amino-2-methylphenol, 6-amino-2,4-xylol, 4-amino-3-cumenol, 4-amino-2-methoxyphenol, 4-aminostyryl alcohol, 4(3'-amino-1-propenyl)phenol, and the like.

Carbonate diamines encompassed by the fourth embodiment of this invention can be prepared from the corresponding hydroxy amine salts having the formula:

$$HX \cdot NH_2-R_4-OH$$

wherein $R_4$ and HX have the same values as previously indicated. Examples of such compounds include the salts of: 4-amino-3-furyl alcohol, 6-amino-2-benzofuranyl alcohol, 7-amino-2-benzopyranyl alcohol, 5-amino-2H-pyran-3-ol, 5-amino-2-benzimidazolyl alcohol, 5-amino-2-benzoxazolyl alcohol, 4-aminoimidazolin-2-yl alcohol, 6-amino-3-isoquinolyl alcohol, and the like.

The bis(aminoaryl) carbonate dihydrohalides can also be conveniently prepared by one or more alternate routes involving, for example, the reaction of nitrophenol and phosgene to form a bis(nitrophenyl) carbonate, followed by reduction of the nitro groups to the corresponding amine groups. Treatment with a hydrogen halide completes the process to form the bis (aminophenyl) carbonate dihydrohalide.

The following examples are illustrative:

EXAMPLE I

*Bis(2-aminoethyl) carbonate and dihydrochloride salt*

A mixture of 61 grams of 2-aminoethyl alcohol (1.0 mole) and 300 milliliters of 1,2,4-trichlorobenzene was saturated with gaseous hydrogen chloride at 69–78° C. Ethyl chloroformate was then added over a period of about fifteen minutes. The reaction temperature was then maintained at about 100° C. for seven hours and subsequently the reaction mixture was treated with an excess of gaseous phosgene at about 100° C. for 7.5 hours. The resulting white solid was separated from the reaction by filtration, washed with ethyl ether, and dried under vacuum at ambient temperature. The dried material, 22 grams, represented a 19.9 percent yield, was water-soluble and had a melting point of 204.5° C. Upon analysis the compound had the following properties: Calculated for $C_5H_{14}Cl_2N_2O_3$: C, 27.15; H, 6.33; N, 12.66. Found: C, 26.90; H, 6.20; N, 12.75. Infrared spectrum was in agreement with that of the assigned structure with absorption maxima at $3.75\mu$, $3.85\mu$, $4.05\mu$ (amine hydrochloride); $5.70\mu$ (carbonate C=O); $8.0\mu$ (carbonate C—O); $10.45\mu$, $12.95\mu$ (open chain carbonate).

Upon basification of the bis(2-aminoethyl) carbonate dihydrochloride, the free carbonate diamine is obtained.

EXAMPLE II

*Bis(2-aminoethyl) carbonate and dihydrochloride salt*

A mixture of 97 grams of 2-aminoethyl alcohol hydrochloride (1.0 mole) and 244 grams of 1,2,4-trichlorobenzene was maintained at a temperature of 70–75° C. for a period of eight hours while gaseous phosgene was being added at a rate of 49 cubic centimeters per minute. By-product hydrogen chloride and excess phosgene were evolved during the reaction. The resulting slurry was cooled, filtered, and the solid product edulcorated with 100 milliliters of dry methanol and dried. The dried product, 107 grams, represented 96.9 percent of the theoretical value, had a melting range of 191–196° C. and an infrared spectrum in agreement with that of the assigned structure. This material was composed with material obtained in a similar manner from other runs and the composite washed with methanol and dried. Upon analysis the compound had the following properties: Calculated for $C_5H_{14}Cl_2N_2O_3$: C, 27.15; H, 6.33; N, 12.66. Found: C, 27.32; H, 6.52; N, 12.37. Infrared spectrum was in agreement with that of the assigned structure.

Upon basification of the bis(2-aminoethyl) carbonate dihydrochloride, the free carbonate diamine is obtained.

EXAMPLE III

*Bis(4-nitrophenyl) carbonate*

A solution containing 417 grams of p-nitrophenol (3.0 moles) in 900 milliliters of benzene was treated with a 20 percent by weight aqueous solution of sodium hydroxide (120 grams, 3.0 moles) with the temperature being maintained at 50° C. Gaseous phosgene was subsequently sparged into the mixture for 2.5 hours at the rate of one mole per hour. The resulting mixture was filtered, the layers separated and the benzene removed from the oil layer by distillation leaving a solid residue. The composited solid from the filtration and oil layer was recrystallized from benzene yielding 432 grams of semi-refined product with a melting point of 140–143° C. The product represented a yield of 94.8 percent of the theoretical value. A sample of this material was recrystallized from an ethylene dichloride-isopropanol mixture for analytical purposes. The following analysis was obtained: Calculated for $C_{13}H_8N_2O_7$: C, 51.3; H, 2.63; N, 9.22. Found: C, 51.2; H, 2.86; N, 8.84. Infrared spectrum was in agreement with that of the assigned structure with maxima at 5.68μ (carbonate C=O); 6.54 and 7.4μ (—NO$_2$); and 8.0μ (carbonate C—O).

EXAMPLE IV

*Bis(4-aminophenyl) carbonate dihydrochloride*

A solution containing 150 grams of bis(4-nitrophenyl) carbonate (0.50 mole) in 2000 milliliters of ethyl acetate was hydrogenated in the presence of 100 grams of Raney nickel with a maximum hydrogen pressure of 300 pounds per square inch at ambient temperatures (15°–20° C.). After the catalyst had been removed, anhydrous hydrogen chloride was sparged into the clear solution. The product, which was isolated by filtration, yielded 125 grams which represented 78.9 percent of the theoretical value and had a decomposition point of 184° C. The following analysis was obtained: Calculated for $C_{13}H_{14}Cl_2N_2O_3$: C, 49.2; H, 4.42; N, 8.83. Found: C, 49.16; H, 4.54; N, 8.70. Infrared bands of functional groups were consistent with those of the assigned structure with maxima at 3.4μ and 3.85μ (NH$_4^+$); 5.60μ (carbonate C=O); 6.25μ and 6.65μ (aromatic C=C); 7.85μ (carbonate C—O); and 12.1μ (para-disubstituted aromatic ring).

Although the invention has been illustrated by the preceding examples, the invention is not to be construed as limited to the materials employed therein, but rather, the invention encompasses the generic area as hereinbefore disclosed. Various modifications and embodiments of this invention can be made without departing from the spirit and scope thereof.

What is claimed is:

1. A diamine of the formula

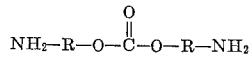

wherein R is of the group consisting of (a) cycloalkylene which has from 4 to 12 carbon atoms, and (b) arylene which has from 6 to 12 carbon atoms.

2. A diamine acid addition salt of the formula

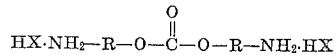

wherein R is of the group consisting of (a) cycloalkylene which has from 4 to 12 carbon atoms, and (b) arylene which has from 6 to 12 carbon atoms; and wherein HX is of the group consisting of hydrogen chloride, hydrogen bromide, sulfuric acid, and phosphoric acid.

3. Bis(4-aminophenyl) carbonate.

4. Bis(4-aminophenyl) carbonate dihydrochloride.

References Cited by the Examiner

UNITED STATES PATENTS 2,380,130   7/1945   Valentine _____ 260—463

FOREIGN PATENTS 887,650   8/1953   Germany.
15,348   6/1895   Great Britain.

OTHER REFERENCES

Mayenburg: Ber. Deut. Chem., vol. 29, pp. 501–513 (1896).

CHARLES B. PARKER, *Primary Examiner.*

F. D. HIGEL, *Assistant Examiner.*